United States Patent [19]

Hosoi

[11] Patent Number: 4,922,105

[45] Date of Patent: May 1, 1990

[54] RADIATION IMAGE STORAGE PANEL

[75] Inventor: Yuichi Hosoi, Kanagawa, Japan

[73] Assignee: Fuji Photo Film Co., Ltd., Kanagawa, Japan

[21] Appl. No.: 306,318

[22] Filed: Feb. 3, 1989

[30] Foreign Application Priority Data

Feb. 5, 1988 [JP] Japan .................................. 63-26322

[51] Int. Cl.[5] .............................................. G01N 23/04

[52] U.S. Cl. .................................. 250/484.1; 428/690

[58] Field of Search .......................... 250/484.1, 327.2; 428/690, 691

[56] References Cited

U.S. PATENT DOCUMENTS

| | | | |
|---|---|---|---|
| 3,743,833 | 7/1973 | Martic et al. | 250/483.1 |
| 4,835,397 | 5/1989 | Arakawa et al. | 250/484.1 B |
| 4,845,369 | 7/1984 | Arakawa et al. | 250/484.1 B |

*Primary Examiner*—Carolyn E. Fields
*Attorney, Agent, or Firm*—Sixbey, Friedman, Leedom & Ferguson

[57] ABSTRACT

An improved radiation image storage panel comprising a support and a stimulable phosphor layer is disclosed. The stimulable phosphor layer comprises an agglomerate of a stimulable phosphor. A strain-reducing layer is provided between the phosphor layer and the support.

10 Claims, No Drawings

RADIATION IMAGE STORAGE PANEL

BACKGROUND OF THE INVENTION

1. Field of the Invention

The present invention relates to a radiation image storage panel employable in a radiation image recording and reproducing method utilizing a stimulable phosphor.

2. Description of Prior Art

As a method replacing a conventional radiography, a radiation image recording and reproducing method utilizing a stimulable phosphor as described, for instance, in U.S. Pat. No. 4,239,968, has been proposed and practically used. In the method, a radiation image storage panel comprising a stimulable phosphor (i.e., stimulable phosphor sheet) is employed, and the method involves the steps of causing the stimulable phosphor of the panel to absorb radiation energy having passed through an object or having radiated from an object; sequentially exciting the stimulable phosphor with an electromagnetic wave such as visible light or infrared rays (hereinafter referred to as "stimulating rays") to release the radiation energy stored in the phosphor as light emission (stimulated emission); photoelectrically detecting the emitted light to obtain electric signals; and reproducing the radiation image of the object as a visible image from the electric signals. The radiation image storage panel is generally used repeatedly, after the recorded image is erased.

In the radiation image recording and reproducing method, a radiation image is obtainable with a sufficient amount of information by applying a radiation to an object at considerably smaller dose, as compared with the conventional radiography using a combination of a radiographic film and a radiographic intensifying screen. Further, the method is very advantageous from the viewpoints of conservation of resources and economical efficiency, because the radiation image storage panel can be repeatedly used in the method, while the radiographic film is consumed in each radiographic process in the conventional radiography.

Moreover, the radiation image recording and reproducing method using a stimulable phosphor is of great value especially when the method is employed for medical diagnosis, because a radiation image can be obtained in the method with a sufficient amount of information by applying a radiation to an object at a small dose as described above.

The radiation image storage panel employed in the above-described method has a basic structure comprising a support and a phosphor layer provided on one surface of the support. If the phosphor layer is self-supporting, the support may be omitted. Further, a transparent film of a polymer material is generally provided on the free surface (surface not facing the support) of the phosphor layer to keep the phosphor layer from chemical deterioration or physical shock.

The phosphor layer generally comprises a binder and a stimulable phosphor dispersed therein. The stimulable phosphor emits light (gives stimulated emission) when excited with an electromagnetic wave (stimulating rays) such as visible light or infrared rays after having been exposed to a radiation such as X-rays. Accordingly, the radiation having passed through an object or radiated from an object is absorbed by the phosphor layer of the panel in proportion to the applied radiation dose, and a radiation image of the object is produced in the panel in the form of a radiation energy-stored image. The radiation energy-stored image can be released as stimulated emission by sequentially irradiating the panel with stimulating rays. The stimulated emission is then photoelectrically detected to give electric signals, so as to reproduce a visible image from the electric signals.

The radiation image recording and reproducing method is very useful for obtaining a radiation image as a visible image as described hereinbefore. It is desired for the radiation image storage panel employed in the method to have a high sensitivity and provide an image of high quality (high sharpness, high graininess, etc.). The radiation image storage panel is repeatedly used, and therefore the panel is further desired to be resistant to physical shocks and environmental variations (variations of temperature, humidity, etc.), from the viewpoints of reliability of the obtained image data, economical efficiency and easiness of handling.

The sensitivity of the radiation image storage panel is essentially determined by the total amount of stimulated emission given by the stimulable phosphor contained therein, and the total emission amount varies depending upon not only the emission luminance of the phosphorut also the content (i.e, amount) of the phosphor in the phosphor layer. The large content of the phosphor also results in increase of absorption of a radiation such as X-rays, so that the panel shows an increased high sensitivity and provides an image of improved quality, especially graininess. On the other hand, assuming that the content of the phosphor in the phosphor layer is kept at the same level, a panel utilizing such a phosphor layer provides an image of high sharpness if the phosphor layer is densely packed with the phosphor, because such phosphor layer can be made thinner to reduce spread of stimulating rays caused by scattering in the phosphor layer.

The phosphor layer is generally prepared by coating a phosphor dispersion comprising stimulable phosphor particles and a binder in an appropriate solvent over a support or a sheet using a known coating means such as a doctor blade or a roll coater and drying the coated layer. Thus prepared phosphor layer comprising a binder and a stimulable phosphor dispersed therein has a certain upper limit with respect to amount of a phosphor incorporatable therein or the density of the phosphor, so that the panel having such phosphor layer cannot show a sensitivity beyond a certain limit or cannot provide an image of sufficiently high quality beyond a certain limit.

There is also known a phosphor layer comprising an agglomerate of a stimulable phosphor other than the above phosphor layer composed of phosphor particles dispersed in a binder.

There have been known methods for forming a phosphor layer which contains no binder and consists of only a stimulable phosphor. For instance, U.S. Pat. No. 3,859,527 teaches a temporary storage medium using a hot pressed phosphor, and Japanese Patent Provisional Publication No. 61(1986)-73100 describes a phosphor layer formed by a firing process.

The present inventor has already applied for patent with respect to a radiation image storage panel comprising a support and a phosphor layer which comprises a sintered stimulable phosphor and a process for the preparation of said panel (U.S. patent application No. 072,698).

The present inventor has also applied for patent with respect to a radiation image storage panel having a phosphor layer of a sintered stimulable phosphor or a deposited stimulable phosphor which is impregnated with a polymer material and a process for the preparation of said panel (U.S. patent application No. 184,010).

The phosphor layer composed of an agglomerate of a stimulable phosphor or a deposited stimulable phosphor can be formed utilizing a sintering method, a deposition method, etc., and the phosphor layer impregnated with a polymer material can be formed by first preparing a phosphor layer of the sintered stimulable phosphor or the deposited stimulable phosphor not containing a polymer material, and then incorporating a polymer material into the phosphor layer.

In those phosphor layers, the phosphor particles are not dispersed in a binder but agglomerated to be in close contact with each other in the absence of a binder. A polymer material if it is incorporated in the aggromerated phosphor layer is present only within voids of the formed agglomerate of the stimulable phosphor (e.g., between boundary portions of the phosphor particles and/or within pore portions of the phosphor particles).

As stated hereinbefore, the radiation image storage panel is desired to be well resistant to physical shocks and environmental variations (variations of temperature, humidity, etc.), to have high sensitivity and to provide an image of high quality. Particularly, a panel having a phosphor layer composed of only an agglomerate of a stimulable phosphor is deformed or placed under strain caused by difference of thermal expansion rate between the phosphor layer and the support, and the deformation or strain gives a stress to the phosphor layer and the support. As a result, the phosphor layer is apt to be cracked or the support is easily distorted. Further, when a physical shock is applied to the support of the panel for example by dropping the panel, the shock is transferred to the phosphor layer to cause cracks of the phosphor layer.

The above-described unfavorable feature can be improved to a certain extent by impregnating a polymer material into the phosphor layer, but the improvement is still not satisfactory.

SUMMARY OF THE INVENTION

It is an object of the present invention to provide a radiation image storage panel which is highly improved in resistance to environmental variations such as a temperature variation and a physical shock.

It is a more specific object of the invention is to provide a radiation image storage panel having a phosphor layer composed of an agglomerate of a stimulable phosphor which is almost free from a crack of the phosphor layer and distortion of the support even when the panel is subjected to temperature variation or physical shock.

There is provided by the present invention a radiation image storage panel comprising a support and a phosphor layer which comprises an agglomerate of a stimulable phosphor, wherein a strain-reducing layer is provided between the phosphor layer and the support.

The terms "strain-reducing layer" used herein means a layer functioning to absorb a shear or a strain caused by temperature variation. The shear or strain is likely produced by difference of thermal expansion between the support and the phosphor layer. The strain-reducing layer is effective to reduce a stress produced between the support and the phosphor layer.

It is assumed that the crack of the phosphor layer and the distortion of the support observed when the radiation image storage panel is placed under the conditions where the temperature varies is produced by the following mechanism.

When the temperature varies, the phosphor layer and the support expand or shrink at different rate because of difference of thermal expansion between the phosphor layer and the support. Thus, shear occurs therebetween. The shear causes strain, and the strain further causes stress. Under the resulting stress, the phosphor layer is easily cracked or the support is likely distorted. Accordingly, at least any one of the shear, strain and the stress should be suppressed to avoid production of cracks in the phosphor layer or distortion of the support.

For suppressing production of the shear, it is considered that the thermal expansions of the phosphor layer and the support be adjusted to the same level, but such adjustment is practically impossible because the phosphor layer and the support are made of completely different materials as described hereinafter. Even if it is succeeded in using appropriate materials for the phosphor layer and the support, there arises such other problem that selection of the materials should be made under specific restriction. The present inventors studied this problem and had an idea that for suppressing the strain, the phosphor layer and the support be kept from direct contact. This gives the present invention wherein a layer having a certain property is interposed therebetween.

It is preferred that modulus of rigidity (described later) of the layer interposed between the phosphor layer and the support is made smaller to reduce production of stress caused by the strain. In the invention, the layer is called "a strain-reducing layer". The strain-reducing layer also functions to reduce a stress caused by strain which is caused by shock applied to the panel from outside of the panel.

In the radiation image storage panel of the present invention, the strain-reducing layer is provided between the support and the stimulable phosphor layer, so that even if any shear or strain occurs in the panel under the temperature variation or the physical shock, the shear or the strain is reduced by the strain-reducing layer and the stress is not produced. Hence, the phosphor layer is hardly cracked and the support is hardly deformed.

DETAILED DESCRIPTION OF THE INVENTION

The radiation image storage panel of the invention comprises a support, a strain-reducing layer and a stimulable phosphor layer, and generally an adhesive layer is provided between the support and the strain-reducing layer or between the strain-reducing layer and the phosphor layer. In the preferred embodiment of the invention, the strain-reducing layer is formed to also serve as an adhesive layer. In this case, accordingly, the adhesive layers between the support and the strain-reducing layer and between the strain-reducing layer and the phosphor layer are unnecessary, and the phosphor layer is directly combined to the support through the strain-reducing layer.

The phosphor layer consisting essentially of an agglomerate of a stimulable phosphor will be described hereinafter.

The stimulable phosphor, as described hereinbefore, gives stimulated emission when excited with stimulating rays after exposure to a radiation. From the viewpoint of practical use, the stimulable phosphor is desired to give stimulated emission in the wavelength region of 300-500 nm when excited with stimulating rays in the wavelength region of 400–900 nm.

Examples of the stimulable phosphor employable in the radiation image storage panel of the present invention include:

SrS:Ce,Sm, SrS:Eu,Sm, $ThO_2$:Er, and $La_2O_2S$:Eu,Sm;

ZnS:Cu,Pb, $BaO\cdot xAl_2O_3$:Eu, in which x is a number satisfying the condition of $0.8 \leqq x \leqq 10$, and $M^{2+}O\cdot xSiO_2$:A, in which $M^{2+}$ is at least one divalent metal selected from the group consisting of Mg, Ca, Sr, Zn, Cd and Ba, A at least one element selected from the group consisting of Ce, Tb, Eu, Tm, Pb, Tl, Bi and Mn, and x is a number satisfying the condition of $0.5 \leqq x \leqq 2.5$;

$(Ba_{1-x-y},Mg_x,Ca_y)FX:aEu^{2+}$, in which X is at one element selected from the group consisting of Cl and Br, x and y are numbers satisfying the conditions of $0<x+y \leqq 0.6$ and $xy \neq 0$, and a is a number satisfying the condition of $10^{-6} \leqq a \leqq 5 \times 10^{-2}$;

LnOX:xA, in which Ln is at least one element selected from the group consisting of La, Y, Gd and Lu, X is at least one element selected from the group consisting of Cl and Br, A is at least one element selected from the group consisting of Ce and Tb, and x is a number satisfying the condition of $0 \leqq x \leqq 0.1$;

$(Ba_{1-x},M^{II}{}_x)FX:yA$, in which $M^{II}$ is at least one divalent metal selected from the group consisting of Mg, Ca, Sr, Zn and Cd, X is at least one element selected from the group consisting of Cl, Br and I, A is at least one element selected from the group consisting of Eu, Tb, Ce, Tm, Dy, Pr, Ho, Nd, Yb and Er, and x and y are numbers satisfying the conditions of $0 \leqq x \leqq 0.6$ and $0 \leqq y \leqq 0.2$, respectively;

$M^{II}FX\cdot xA$ yLn, in which $M^{II}$ is at least one element selected from the group consisting of Ba, Ca, Sr, Mg, Zn and Cd; A is at least one compound selected from the group consisting of BeO, MgO, CaO, SrO, BaO, ZnO, $Al_2O_3$, $Y_2O_3$, $La_2O_3$, $In_2O_3$, $SiO_2$, $TiO_2$, $ZrO_2$, $GeO_2$, $SnO_2$, $Nb_2O_5$, $Ta_2O_5$ and $ThO_2$; Ln is at least one element selected from the group consisting of Eu, Tb, Ce, Tm, Dy, Pr, Ho, Nd, Yb, Er, Sm and Gd; X is at least one element selected from the group consisting of Cl, Br and I; and x and y are numbers satisfying the conditions of $5 \times 10^{-5} \leqq x \leqq 0.5$ and $0<y \leqq 0.2$, respectively;

$(Ba_{1-x},M^{II}{}_x)F_2\cdot aBaX_2$:yEu,zA, in which $M^{II}$ is at least one element selected from the group consisting of Be, Mg, Ca, Sr, Zn and Cd; X is at least one element selected from the group consisting of Cl, Br and I: A is at least one element selected from the group consisting of Zr and Sc; and a, x, y and z are numbers satisfying the conditions of $0.5 \leqq a \geqq 1.25$, $0 \leqq x \leqq 1$, $10^{-6} \leqq y \leqq 2 \times 10^{-1}$, and $0<z \leqq 10^{-2}$respectively;

$(Ba_{1-x}, M^{II}{}_x)F_2\cdot aBaX_2$:yEu,zB, in which $M^{II}$ is at least one element selected from the group consisting of Be, Mg, Ca, Sr, Zn and Cd; X is at least one element selected from the group consisting of Cl, Br and I; and a, x, y and z are numbers satisfying the conditions of $0.5 \leqq a \leqq 1.25$, $0 \leqq x \leqq 1$, $10^{-6} \leqq y \leqq 2 \times 10^{-1}$, and $0<z \leqq 2 \times 10^{-1}$, respectively:

$(Ba_{1-x},M^{II}{}_x)F_2\cdot aBaX_2$:yEu,zA, in which $M^{II}$ is at least one element selected from the group consisting of Be, Mg, Ca, Sr, Zn and Cd; X is at least one element selected from the group consisting of Cl, Br and I; A is at least one element selected from the group consisting of As and Si; and a, x, y and z are numbers satisfying the conditions of $0.5 \leqq a \leqq 1.25$, $0 \leqq x \leqq 1$, $10^{-6} \leqq y \leqq 2 \times 10^{-1}$, and $0<z \leqq 5 \times 10^{-1}$, respectively;

$M^{III}OX$:xCe, in which $M^{III}$ is at least one trivalent metal selected from the group consisting of Pr, Nd, Pm, Sm, Eu, Tb, Dy, Ho, Er, Tm, Yb, and Bi; X is at least one element selected from the group consisting of Cl and Br; and x is a number satisfying the condition of $0<x<0.1$;

$Ba_{1-x}M_{x/2}L_{x/2}FX:yEu^{2+}$, in which M is at least one alkali metal selected from the group consisting of Li, Na, K, Rb and Cs; L is at least one trivalent metal selected from the group consisting of Sc, Y, La, Ce, Pr, Nd, Pm, Sm, Gd, Tb, Dy, Ho, Er, Tm, Yb, Lu, Al, Ga, In and Tl; X is at least one halogen selected from the group consisting of Cl, Br and I; and x and y are numbers satisfying the conditions of $10^{-2} \leqq x \leqq 0.5$ and $0<y \leqq 0.1$, respectively;

$BaFX\cdot xA:yEu^{2+}$, in which X is at least one halogen selected from the group consisting of Cl, Br and I; A is at least one fired product of a tetrafluoroboric acid compound; and x and y are numbers satisfying the conditions of $10^{-6} \leqq x \leqq 0.1$ and $0<y \leqq 0.1$, respectively;

$BaFX\cdot xA:yEu^{2+}$, in which X is at least one halogen selected from the group consisting of Cl, Br and I; A is at least one fired product of a hexafluoro compound selected from the group consisting of monovalent and divalent metal salts of hexafluoro silicic acid, hexafluoro titanic acid and hexafluoro zirconic acid; and x and y are numbers satisfying the conditions of $10^{-6} \leqq x \leqq 0.1$ and $0<y \leqq 0.1$, respectively;

$BaFX\cdot xNaX':aEu^{2+}$, in which each of X and X' is at least one halogen selected from the group consisting of Cl, Br and I; and x and a are numbers satisfying the conditions of $0<x \leqq 2$ and $0<a \leqq 0.2$, respectively;

$M^{II}FX\cdot xNaX':yEu^{2+}:zA$, in which $M^{II}$ is at least one alkaline earth metal selected from the group consisting of Ba, Sr and Ca; each of X and X' is at least one halogen selected from the group consisting of Cl, Br and I; A is at least one transition metal selected from the group consisting of V, Cr, Mn, Fe, Co and Ni; and x, y and z are numbers satisfying the conditions of $0<x \leqq 2$, $0<y \leqq 0.2$ and $0<z \leqq 10^{-2}$, respectively;

$M^{II}FX\cdot aM^{I}X'\cdot bM'^{II}X''_2\cdot cM^{III}X'''_3\cdot xA:yEu^{2+}$, in which $M^{II}$ is at least one alkaline earth metal selected from the group consisting of Ba, Sr and Ca; $M^{I}$ is at least one alkali metal selected from the group consisting of Li, Na, K, Rb and Cs; $M'^{II}$ is at least one divalent metal selected from the group consisting of Be and Mg; $M^{III}$ is at least one trivalent metal selected from the group consisting of Al, Ga, In and Tl; A is at least one metal oxide; X is at least one halogen selected from the group consisting of Cl, Br and I; each of X', X'' and X''' is at least one halogen selected from the group consisting of F, Cl, Br and I; a, b and c are numbers satisfying the conditions of $0 \leqq a \leqq 2$, $0 \leqq b \leqq 10^{-2}$, $0 \leqq c \leqq 10^{-2}$ and $a+b+c \geqq 10^{-6}$ and x and y are numbers satisfying the conditions of $0<x \leqq 0.5$ and $0<y \leqq 0.2$, respectively;

$M^{II}X_2\cdot aM^{II}X'_2:xEu^{2+}$, in which $M^{II}$ is at least one alkaline earth metal selected from the group consisting of Ba, Sr and Ca; each of X and X' is at least one halogen selected from the group consisting of Cl, Br and I, and $X \neq X'$; and a and x are numbers satisfying the conditions of 0.1'a$\leqq$10.0 and $0<x \leqq 0.2$, respectively;

$M^{II}FX\cdot aMIX':xEu^{2+}$, in which $M^{II}$ is at least one alkaline earth metal selected from the group consisting of Ba, Sr and Ca; $M^{I}$ is at least one alkali metal selected from the group consisting of Rb and Cs; X is at least one halogen selected from the group consisting of Cl, Br and I; X' is at least one halogen selected from the group consisting of F, Cl, Br and I; and a and x are numbers satisfying the conditions of $0<a\leqq 4.0$ and $0<x\leqq 0.2$, respectively;

$M^{I}X{:}xBi$, in which $M^{I}$ is at least one alkali metal selected from the group consisting of Rb and Cs; X is at least one halogen selected from the group consisting of Cl, Br and I; and x is a number satisfying the condition of $0<x\leqq 0.2$.

The $M^{II}X_2{\cdot}aM^{II}X'_2{:}xEu^{2+}$ phosphor may further contain the following additives:

$bM^{I}X''$, in which $M^{I}$ is at least one alkali metal selected from the group consisting of Rb and Cs; X'' is at least one halogen selected from the group consisting of F, Cl, Br and I; and b is a number satisfying the condition of $0<b\leqq 10.0$;

$bKX''{\cdot}cMgX'''_2{\cdot}dM^{III}X''''_3$, in which $M^{III}$ is at least one trivalent metal selected from the group consisting of Sc, Y, La, Gd and Lu; each of X'', X''' and X'''' is at least one halogen selected from the group consisting of F, Cl, Br and I; and b, c and d are numbers satisfying the conditions of $0\leqq b\leqq 2.0$, $0\leqq c\leqq 2.0$ and $0\leqq d\leqq 2.0$, and $2\times 10^{-5}\leqq b+c+d$;

bA, in which A is at least one oxide selected from the group consisting of $SiO_2$ and $P_2O_5$; and b is a number satisfying the condition of $10^{-4}\leqq b\leqq 2\times 10^{-1}$;

yB, in which y is a number satisfying the condition of $2\times 10^{-4}\leqq b\leqq 2\times 10^{-1}$;

bSiO, in which b is a number satisfying the condition of $0<b<3\times 10^{-2}$;

$bSnX''_2$, in which X'' is at least one halogen selected from the group consisting of F, Cl, Br and I; and b is a number satisfying the condition of $0<b<10^{-3}$;

$bCsX''{\cdot}cSnX'''_2$, in which each of X'' and X''' is at least one halogen selected from the group consisting of F, Cl, Br and I; and b and c are numbers satisfying the conditions of $0\leqq b\leqq 10.0$ and $10^{-6}\leqq c\leqq 2\times 10^{-2}$, respectively; and $bCsX''{\cdot}yLn^{3+}$, in which X'' is at least one halogen selected from the group consisting of F, Cl, Br and I; Ln is at least one rare earth element selected from the group consisting of Sc, Y, Ce, Pr, Nd, Sm, Gd, Tb, Dy, Ho, Er, Tm, Yb and Lu; and b and y are numbers satisfying the conditions of $0<b\leqq 10.0$ and $10^{-6}\leqq y\leqq 1.8\times 10^{-1}$, respectively.

Among the above-described stimulable phosphors, the divalent europium activated alkaline earth metal halide phosphor and the rare earth element activated rare earth oxyhalide phosphor are particularly preferred, because these phosphors show stimulated emission of high luminance. The above-described stimulable phosphors are given by no means to restrict the stimulable phosphor employable in the present invention. Any other phosphors can be also employed, provided that the phosphor gives stimulated emission when excited with stimulating rays after exposure to a radiation.

The phosphor layer comprising an agglomerate of the stimulable phosphor can be formed, for instance, by the following process utilizing a sintering method. The process comprises the steps of molding a phosphor layer-forming material containing a stimulable phosphor into a sheet and sintering the molded product.

In the procedure of molding the phosphor layer-forming forming material into a sheet, a powder material comprising particles of the above-described stimulable phosphor is employed as the phosphor layer-forming material.

A dispersion containing stimulable phosphor particles and a binder can be also employed. In this case, the stimulable phosphor particles and the binder are added to an appropriate solvent, and they are well mixed to prepare a dispersion in which the phosphor particles are homogeneously dispersed in a binder solution.

The binder is preferably selected from materials having excellent properties such as high dispersibility of phosphor and high exhalation in the succeeding sintering procedure. Examples of the binder include paraffin such as paraffin having 16–40 carbon atoms and a melting point of 37.8–64.5° C.; wax such as natural wax (e.g., vegetable wax such as candelilla wax, carnauba wax, rice wax and Japan wax; animal wax such as beeswax, lanolin and whale wax; and mineral wax such as montan wax, ozocerite and ceresin) and synthetic wax (e.g., coal wax such as polyethylene wax and Fischer-Tropsch wax; and oil wax such as curing castor oil, fatty acid amide and ketone); and resins such as polyvinyl butyral, polyvinyl acetate, nitrocellulose, ethyl cellulose, vinylidene chloride-vinyl chloride copolymer, polyalkyl (meth)acrylate, vinyl chloride-vinyl acetate copolymer, polyurethane cellulose acetate butylate, polyvinyl alcohol and linear polyester. Also employed are proteins such as gelatin, polysaccharides such as dextran and gum arabic.

Examples of the solvent employable in the preparation of the dispersion include lower alcohols such as methanol, ethanol, n-propanol and n-butanol; chlorinated hydrocarbons such as methylene chloride and ethylene chloride; ketones such as acetone, methyl ethyl ketone and methyl isobutyl ketone; esters of lower alcohols with lower aliphatic acids such as methyl acetate, ethyl acetate and butyl acetate; ethers such as dioxane, ethylene glycol monoethylether and ethylene glycol monoethyl ether; and mixtures of the above-mentioned compounds.

The ratio between the binder and the stimulable phosphor in the dispersion is determined according to the nature of the phosphor employed or conditions in the molding and sintering procedures described hereinafter. Generally, the ratio therebetween is within the range of from 1:1 to 1:300 (binder:phosphor, by weight), preferably from 1:20 to 1:150.

The dispersion may contain a dispersing agent to assist the dispersibility of the phosphor particles therein. Examples of the dispersing agent include phthalic acid, stearic acid, caproic acid and a hydrophobic surface active agent.

In the case that the phosphor layer-forming material is a powder material, a molding tool is charged with the powder material to mold the material into a sheet. As the molding tool, a rectangular metal mold is generally employed. In the case that the phosphor layer-forming material is a dispersion, the dispersion is applied onto an appropriate substrate (support or false sheet) by the known coating method such as a method using a doctor blade to be molded into a sheet. Alternatively, the dispersion is introduced into a molding tool and molded into a sheet in the same manner as the case of the powder material.

In the course of the molding procedure, the phosphor layer-forming material may be subjected to a compression treatment, especially in the case of using the powder material. The compression treatment is carried out, for instance, by press molding, wherein the forming material is preferably placed under a pressure ranging from $1\times 10^{2}$ to $1\times 10^{4}$ kgf/cm$^2$. Thus, the resulting phosphor layer is further increased in the relative density.

The molded product in the form of sheet (i.e. molded sheet) prepared as above is then subjected to a sintering procedure.

The sintering procedure is performed using a firing furnace such as an electric furnace. Temperature and time for the sintering are determined according to the kind of the phosphor layer-forming material, the shape and the state of the sheet-form molded product and the nature of the employed stimulable phosphor. When the molded sheet is composed of the powder material comprising the stimulable phosphor, the sintering temperature is generally in the range of 500° to 1,000° C., preferably in the range of 700° to 950° C. The sintering time is preferably in the range of 0.5 to 6 hours. As the sintering atmosphere, there can be employed an inert atmosphere such as a nitrogen gas atmosphere and an argon gas atmosphere, or a weak reducing atmosphere such as a nitrogen gas atmosphere containing a small amount of hydrogen gas and a carbon dioxide atmosphere containing carbon monoxide.

When the molded sheet is composed of the dispersion containing the stimulable phosphor and the binder, it is preferred that the binder therein is previously vaporized at a relatively low temperature (temperature in the range of 100° to 450° C.) in an inert atmosphere such as a nitrogen gas atmosphere and an argon gas atmosphere, or an oxidizing atmosphere such as an oxygen gas atmosphere and an air atmosphere. Successively, the phosphor is sintered under the above-described conditions. Through the vaporization in the low temperature range, the components other than the stimulable phosphor such as the binder are vaporized or carbonized and further extinguish as a carbon dioxide gas. Thus, the components other than the stimulable phosphor can be readily removed from the dispersion. As a result, the sintered phosphor layer consisting of the stimulable phosphor is produced. The time required for the low-temperature vaporization is preferably in the range of 0.5 to 6 hours.

The compression treatment may be carried out prior to the sintering procedure as described above, and the treatment can be also performed in the sintering procedure. That is, the molded sheet may be sintered while being compressed. This is particularly preferred when the molded sheet is made of the powder material of phosphor particles.

The phosphor layer prepared as above has a relative density of not less than 70 %. The grain boundary size of the phosphor in the phosphor layer is preferably in the range of 1 to 100 μm. The thickness of the phosphor layer varies depending upon the characteristics of an aimed radiation image storage panel, etc. Generally, the thickness thereof is in the range of 20 μm to 1 mm, preferably in the range of 50 to 500 μm.

The phosphor layer can be also formed utilizing other methods such as a hot-pressing method and a deposition method than the above-mentioned sintering method.

In the radiation image storage panel of the invention, the above-prepared phosphor layer comprising an agglomerate of the stimulable phosphor may further contain a polymer material by impregnating the polymer material thereinto.

The phosphor layer prepared as above is then fixed on the support (described hereinafter) via an intermediate layer in the form of a strain-reducing layer.

The radiation image storage panel of the invention can be prepared, for example, by the following process.

In the first place, a strain-reducing layer is fixed on a support using an appropriate adhesive. Then, the phosphor layer prepared as above is separated from the false support, and combined with the strain-reducing layer using an adhesive under application of pressure. In the case that the strain-reducing layer is arranged to further serve as an adhesive layer, a material for the preparation of the strain-reducing layer is coated on the support, and the phosphor layer is directly provided thereon.

When the phosphor layer is formed utilizing a deposition method, the stimulable phosphor is deposited on the support which has been previously provided with the strain-reducing layer to form a phosphor layer on the strain-reducing layer.

A polymer material may be incorporated into the phosphor layer. Such incorporation may be conducted prior to the formation of the phosphor layer on the support, or may be conducted after provision of the phosphor layer on the support.

A support material employable in the invention can be selected from those employed in the conventional radiographic intensifying screens or those employed in the known radiation image storage panels. Examples of the support material include plastic films such as films of cellulose acetate, polyester, polyethylene terephthalate, polyamide, polyimide, triacetate and polycarbonate; metal foils such as aluminum foil and aluminum alloy foil metal sheet; ceramic sheet; ordinary papers; baryta paper; resin-coated papers; pigment papers containing titanium dioxide or the like; and papers sized with polyvinyl alcohol or the like. The support may contain a light-absorbing material such as carbon black, or may contain a light-reflecting material such as titanium dioxide.

The radiation image storage panel of the invention is characterized in that a strain-reducing layer is provided between the phosphor layer and the support.

As mentioned hereinbefore, the strain occurring in the panel with the temperature variation is caused by difference between the thermal expansion of the phosphor layer and that of the support, that is, the strain is caused by shear produced therebetween. When the strain-reducing layer is interposed between the phosphor layer and the support, the relationship between the shear and the strain is expressed by the following equation (I):

$$\gamma = \Delta l / d \qquad \text{(I)}$$

wherein $\gamma$, $\Delta l$ and d mean a strain, a difference of the thermal expansion length (degree of shear) and a thickness of the strain-reducing layer, respectively.

As is apparent from the equation (I), the strain caused by the difference between the thermal expansion of the phosphor layer and that of the support is reduced, as thickness of the strain-reducing layer is made larger. However, if the thickness of the strain-reducing layer is too large, not only the weight of the strain-reducing layer gives increased weight to the support, but also the thickness and the weight of the panel increase, resulting in inconvenience in handling of the panel. Accordingly, the thickness of the strain-reducing layer is preferably in the range of 5 to 5,000 μm, more preferably in the range of 10 to 500 μm, from the viewpoints of appropriate thickness proportion to other layers.

As described above, the strain-reducing layer serves to absorb the shear and the strain occurring under the temperature variation and reduce a stress given to the support and the phosphor layer. Further, the strain-reducing layer also serves to absorb a strain caused by an external shock.

The relationship between the stress and the strain is expressed by the following equation (II):

$$\tau = G \cdot \gamma \qquad \text{(II)}$$

wherein $\tau$, $\gamma$ and G mean a stress, a strain and a modulus of rigidity (also referred to as "modulus in shear" or "modulus of transverse elasticity"), respectively. G is a constant inherent to materials.

Since the strain-reducing layer functions to make a stress smaller even when a large strain is applied to the layer, the modulus of rigidity (G) is required to be small. The modulus of rigidity of the strain-reducing layer is preferably not more than 10 $kgf/mm^2$ in consideration of the difference between the thermal expansion of the phosphor layer consisting essentially of an agglomerate of a stimulable phosphor and that of the support. Examples of materials employable for the strain-reducing layer include natural rubbers and synthetic rubbers (e.g., butadiene rubber, isoprene rubber, polychloroprene rubber, silicone rubber, urethane rubber, butyl rubber, acrylic rubber and nitrile rubbers). Also employable are materials having a small modulus of rigidity such as styrene foam and polyethylene foam.

In the known radiation image storage panel, one or more additional layers are optionally provided between the support and the phosphor layer. For instance, a subbing layer or an adhesive layer may be provided by coating a polymer material such as gelatin over the surface of the support on the phosphor layer-side to enhance the adhesion therebetween. A light-reflecting layer containing a light-reflecting material such as titanium dioxide or a light-absorbing layer containing a light-absorbing material such as carbon black may be provided on the support to improve the sensitivity of the panel and the quality of an image (sharpness and graininess) provided by the panel. These layers can be also provided on the support of the panel according to the invention. Further, these layers may also be prepared to appropriately function as the strain-reducing layer. However, the conventional undercoating layer made of gelatin or a light-reflecting layer prepared by dispersing a light-reflecting material in a resin binder does not function as the strain-reducing layer, because the rigidity of the layer is too high.

On the surface of the phosphor layer not facing the support, a transparent protective film may be provided to protect the phosphor layer physically and chemically.

The transparent protective film can be formed on the phosphor layer by coating the surface of the phosphor layer with a solution of a transparent polymer such as a cellulose derivative (e.g. cellulose acetate or nitrocellulose) or a synthetic polymer (e.g. polymethyl methacrylate, polyvinyl butyral, polyvinyl formal, polycarbonate, polyvinyl acetate, or vinyl chloride-vinyl acetate copolymer), and drying the coated solution. Alternatively, the protective film can be provided on the phosphor layer by beforehand preparing a film for forming a protective film from a plastic sheet made of polyethylene terephthalate, polyethylene, polyvinylidene chloride or polyamide; or a transparent glass sheet, followed by placing and fixing it onto the phosphor layer with an appropriate adhesive agent. Otherwise, ceramics such as $SiO_2$, glasses and organic materials may be deposited or baked on the surface of the phosphor layer to form a protective film on the phosphor layer. The transparent protective film preferably has a thickness within the range of approx. 3 to 20 μm.

An example of the present invention and a comparison example are given below, but the examples are understood by no means to restrict the invention.

EXAMPLE 1

Divalent europium activated barium fluorobromide ($BaFBr:0.001Eu^{2+}$) phosphor particles were charged into a metal mold and compressed to obtain a molded sheet. The compression was done by means of a press molding machine (pressure: $10^3$ $kgf/cm^2$, temperature: 25° C.).

Subsequently, the molded sheet was placed in a high-temperature electric furnace and sintered. The sintering was carried out at 750° C. for 1.5 hours in a nitrogen gas atmosphere. After the sintering, the sintered product was taken out of the furnace and allowed to stand for cooling, to form a phosphor layer consisting of only the phosphor and having a thickness of approx. 300 μm.

On an aluminum plate (support, thickness: 1 mm) was coated a polychloroprene adhesive (Evergrit 503-S of A.C.I., Japan Ltd.) to form a strain-reducing layer also functioning as an adhesive layer (thickness: 100 μm, modulus of rigidity: 0.5 $kgf/mm^2$) on the support, and the above-obtained phosphor layer was fixed onto the strain-reducing layer.

Thus, a radiation image storage panel (430mm×354 mm) of the invention comprising a support, a strain-reducing layer and a phosphor layer was prepared.

COMPARISON EXAMPLE 1

The procedures of Example 1 were repeated except for using an epoxy adhesive (Threebond 2082 of Threebond Co., Ltd.) instead of polychloroprene, to prepare a radiation image storage panel comprising a support, an adhesive layer (thickness: 100 μm, modulus of rigidity: 100 $kgf/mm^2$) and a phosphor layer.

EVALUATION OF RADIATION IMAGE STORAGE PANEL

Each of the radiation image storage panels obtained in Example 1 and Comparison Example 1 was placed under conditions that the temperature varied from 0 to 40° C., and observed on the occurrence of cracks of the phosphor layer and the tendency of distortion of the support.

The results are set forth in Table 1.

Further, the stress of each panel caused by the temperature variation was calculated using the aforementioned equations (I) and (II). The obtained values are also set forth in Table 1. In the evaluation test, the thermal expansions of the aluminum plate support and the phosphor layer are taken as $2.3 \times 10^{-5}$/K and $6.0 \times 10^{-5}$/K, respectively.

TABLE 1

| | Crack of Phosphor Layer | Distortion of Support | Stress ($kgf/mm^2$) Long Direction | Transverse Direction |
|---|---|---|---|---|
| Example 1 | not observed | not observed | 3.1 | 2.6 |
| Com. Ex. 1 | observed | observed | 620 | 510 |

As is evident from the results given in Table 1, the radiation image storage panel having a strain-reducing layer according to the invention (Example 1) was much more enhanced in the resistance to the temperature variation, as compared with the conventional radiation image storage panel not having a strain-reducing layer (Comparison Example 1), and the panel of the invention suffered from any crack of the phosphor layer and any distortion of the support even when exposed to the temperature variation. As is also evident from the results, in the panel of the invention, the strain given to the support by the external force is reduced owing to the presence of the strain-reducing layer and accordingly the stress given to the phosphor layer is also reduced, so that no crack was observed in the phosphor layer of the radiation image storage panel of the invention.

I claim:

1. A radiation image storage panel comprising a support and a phosphor layer provided thereon which comprises an agglomerate of a stimulable phosphor, in which a strain-reducing layer is provided between the phosphor layer and the support.

2. The radiation image storage panel as claimed in claim 1, wherein the phosphor layer consists essentially of a sintered stimulable phosphor.

3. The radiation image storage panel as claimed in claim 1, wherein the phosphor layer consists essentially of a deposited stimulable phosphor.

4. The radiation image storage panel as claimed in claim 1, wherein the phosphor layer is impregnated with a polymer material.

5. The radiation image storage panel as claimed in claim 1, wherein the strain-reducing layer is fixed to the support and the phosphor layer.

6. The radiation image storage panel as claimed in claim 1, wherein the strain-reducing layer has a modulus of rigidity of not more than 10 $kgf/mm^2$.

7. The radiation image storage panel as claimed in claim 1, wherein the strain-reducing layer is made of a material selected from the group consisting of natural rubbers and synthetic rubbers.

8. The radiation image storage panel as claimed in claim 1, wherein the strain-reducing layer is made of a material selected from the group consisting of butadiene rubber, isoprene rubber, polychloroprene rubber, silicone rubber, urethane rubber, butyl rubber, acrylic rubber and nitrile rubbers.

9. The radiation image storage panel as claimed in claim 1, wherein the strain-reducing layer is made of a styrene foam or a polyethylene foam.

10. The radiation image storage panel as claimed in claim i, wherein the strain-reducing layer has a thickness in the range of 5 to 5,000 $\mu m$.

* * * * *